United States Patent

Pan et al.

[11] Patent Number: 5,849,458
[45] Date of Patent: Dec. 15, 1998

[54] RECORDABLE OPTICAL DEVICE INCLUDING A BARRIER LAYER

[75] Inventors: Kee-Chuan Pan, Pittsford; Yuan-Sheng Tyan; Guiseppe Farruggia, both of Webster; Donald R. Preuss, Rochester, all of N.Y.

[73] Assignee: Eastman Kodak Company, Rochester, N.Y.

[21] Appl. No.: 840,212

[22] Filed: Apr. 11, 1997

[51] Int. Cl.⁶ .................................................... G03C 1/492
[52] U.S. Cl. .................. 430/270.13; 430/346; 430/945; 369/288
[58] Field of Search .................. 430/270.13, 270.12, 430/945, 346; 369/283, 288

[56] References Cited

U.S. PATENT DOCUMENTS

| | | | |
|---|---|---|---|
| 4,385,376 | 5/1983 | Takaoka et al. | 430/270.12 |
| 4,500,889 | 2/1985 | Wada et al. | 430/270.12 |
| 4,954,379 | 9/1990 | Nishida et al. | 430/270.13 |
| 4,960,680 | 10/1990 | Pan et al. | 430/945 |
| 5,271,978 | 12/1993 | Vazan et al. | 430/270.13 |
| 5,273,861 | 12/1993 | Yamada et al. | 430/270.13 |
| 5,294,523 | 3/1994 | Nagata et al. | 430/270.13 |
| 5,523,140 | 6/1996 | Tominaga et al. | 430/270.13 |
| 5,604,003 | 2/1997 | Coombs et al. | 430/270.13 |
| 5,688,574 | 11/1997 | Tamura et al. | 430/945 |

*Primary Examiner*—Martin Angebranndt
*Attorney, Agent, or Firm*—Raymond L. Owens

[57] ABSTRACT

For an optical recordable disk, a heat conductive gold layer can be deposited on a phase-change recordable layer to increase the writing threshold. This higher threshold improves the data stability during readout. However, it has been found that there is substantial inter-diffusion between the phase-change layer and the gold layer. The performance is degraded as a result. A barrier layer between the phase-change layer and the gold layer can effectively prevent diffusion and mixing. Using his barrier, the performance is preserved and the data stability is improved.

8 Claims, 1 Drawing Sheet

RECORDABLE OPTICAL DEVICE INCLUDING A BARRIER LAYER

FIELD OF THE INVENTION

The present invention relates to optical recordable devices or elements having a multilayer structure.

BACKGROUND OF THE INVENTION

There are many types of optical recordable materials. One type is the phase-change material which will change from an amorphous state to a crystalline state during laser recording. U.S. Pat. No. 4,960,680 discloses a phase-change material comprising Sb, Sn, and In. This material has good carrier-to-noise ratio (CNR) and is very sensitive to laser recording.

This high sensitivity is desirable for high speed recording. However, for lower speed applications such as compact disc (CD) or digital versatile disc (DVD) type recording and for shorter wavelength applications, the writing threshold power can be quite close to required read power. (The writing threshold power is the lowest laser power, at the current writing conditions, at which the medium is altered.) This can lead to read instability as well as problems with proper writing. For these applications, the writing threshold needs to be increased.

SUMMARY OF THE INVENTION

It is an object of the present invention to provide an optical disk which uses a heat conductive layer to increase the writing threshold power of the disk, while preventing any interaction between the heat conductive layer and the phase-change recordable layer.

In accordance with the invention, a thermally conductive material, such as gold, is coated directly onto the phase-change recordable layer to conduct away some of the heat generated during reading and writing of data. Quite surprisingly, it has been determined that there is considerable inter-diffusion between the Sb—Sn—In alloy layer and the gold layer. This leads to performance degradation.

This object is achieved by an optical recordable device comprising:

a) a transparent substrate;

b) a phase-change recordable layer which is adapted to change phase and record data in response to laser heating and being disposed over the transparent substrate;

c) a barrier layer disposed on the phase-change recordable layer; and d) a heat conductive layer, comprised of a metal or alloy, disposed on the barrier layer and selected to conduct heat during writing and reading of data; the barrier layer being selected to prevent interaction between the heat conductive layer and the phase-change recordable layer.

It has been found quite unexpectedly that an oxide barrier layer can effectively prevent interaction between the heat conductive layer and the phase-change recordable layer when disposed between those two layers. This oxide layer eliminates diffusion and mixing.

Devices made in accordance with the present invention prevent the interaction between the heat conductive layer and the phase-change recordable layer. This enables us to use a heat conductive layer to raise the writing threshold. This higher threshold is useful during readout because it prevents damage to the data recorded in the phase-change recordable layer.

DETAILED DESCRIPTION OF THE INVENTION

Figure 1:
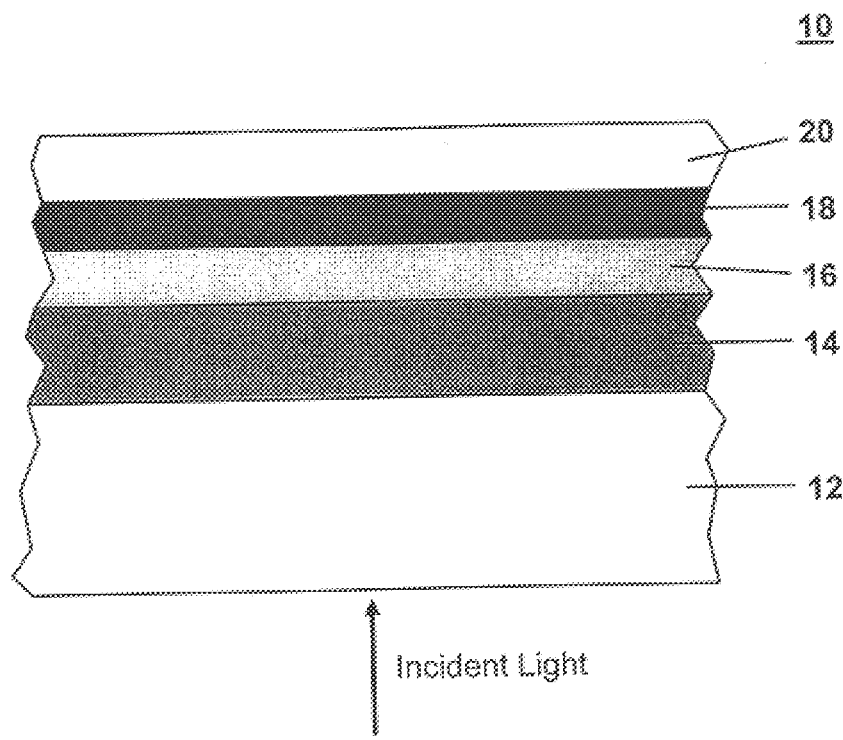
FIG. 1 is a cross sectional view of a portion of a device in accordance with the present invention.

Turning now to FIG. 1, there is shown an optical recordable device 10 which includes a transparent substrate 12. Preferably, the substrate 12 is made of a transparent material such as polycarbonate. A phase-change recordable layer 14 is formed on the transparent substrate 12. The recorded area of this phase-change layer changes from amorphous state to crystalline state during laser recording.

A barrier layer 16 is formed on the phase-change layer. The barrier layer can be provided as an oxide of the phase-change material. The surface of the phase-change layer can be oxidized when exposed in an oxygen-rich atmosphere at high temperature. The barrier layer can also be formed on the phase-change recordable layer by sputtering metals or alloys in the presence of oxygen. The barrier layer includes materials selected from the group consisting of oxides, nitrides, carbides, and sulfides.

On top of the barrier layer is formed a heat conductive layer 18 which can be prepared by sputtering gold in argon. Other metals and alloys can also be used. For example, the heat conductive layer can have materials selected from the group consisting of Au, Ag, Sb, Al, Cu, and alloys thereof. Finally, a protective layer 20 may be applied on top of the heat conductive layer, which can be applied by spin coating a lacquer which can be cured by ultraviolet exposure.

There are many ways to increase writing threshold. It can be done by adding dopants and/or by using a thinner recordable layer. Preferably, a gold backing layer has been found to increase the threshold and functions as a heat sink. Little effect is seen with a layer thickness of less than 2 nm. Gold layers up to 25 nm in thickness progressively increase the threshold writing power. Beyond 25 nm, the carrier signal begins to drop significantly, and the cost of applying the layer becomes less practical. It should be noted that at these thicknesses, the gold does not function as a reflector in the optical recordable device, but serves only as a thermal conductor.

A purpose of the barrier layer 16 is to prevent interactions (such as inter-diffusion) between the phase change recordable layer and the heat conductive layer, is typically between 1 nm and 20 nm thick. Below 1 nm the protection offered is detectable, but is insufficient. At thicknesses above 20 nm, the barrier layer becomes impractical due to both increased cost of application, and reduced benefit from the heat conductive layer.

In accordance with the present invention, there is provided an optical recordable element comprising a phase-change layer, a barrier layer, and a heat conductive layer.

The following example is presented for an understanding of this invention.

EXAMPLE

Thin films of this invention were prepared by a sputtering process. The Sb—Sn—In alloy layer was deposited in argon onto a polycarbonate substrate using an alloy target. The argon flow was 7 sccm with a pressure of 4 mTorr. The sputtering power was 75 W and the time was 44 seconds. The thickness was about 80 nm.

The Sb—Sn—In oxide layer, functioning as a barrier layer, was prepared in an Ar—$O_2$ mixture with the same alloy target. The sputtering conditions for the oxide were 7 sccm argon and 7.5 sccm $O_2$ with a total pressure of 7.8 mTorr. The sputtering power was 75 W and the time was 10 seconds. the approximate thickness was 10 nm.

The gold layer was then sputtered in Ar. The argon flow was 7 sccm with a pressure of 4 mTorr. The sputtering power was 150 W and the time was 8 seconds. The thickness was about 10 nm.

The layers were deposited one by one without removal from the vacuum chamber.

Table I shows the threshold and CNR of three samples. They were heat treated at 95° C. for 17 hours to accelerate the diffusion process if there was any. The disks were tested at 6 m/s, using 1 MHz carrier frequency, 1.04 mW read power, 0.55 NA and 780 nm laser.

Comparing samples #2, and #3 with sample #1, the gold layer always increases threshold. However, sample #2 shows inferior performance possibly due to the inter-diffusion. But note that with an oxide barrier as shown in sample #3, the performance is not degraded.

TABLE I

Threshold and CNR for various structures

| Sample # | Disk structure | Threshold, mW | CNR, dB at power = 2× threshold |
|---|---|---|---|
| 1 | 80 nm Sb—Sn—In | 2.7 | 52 |
| 2 | 80 nm Sb—Sn—In/ 10 nm Au | 4.3 | 42 |
| 3 | 80 nm Sb—Sn—In/ 10 nm oxide/ 10 nm Au | 3.7 | 53.6 |

We also determined the depth profile of various elements by Rutherford Backscattering Spectroscopy (RBS) as shown in Table II. It is obvious that the inter-diffusion between the Sb-Sn-In and the Au layers is severe for sample #2. Some of the Sb—Sn—In atoms diffuse through the gold layer and form an oxide layer on top of the gold. This is a thermodynamically favored process and it is the driving force for diffusion.

This inter-diffusion phenomenon can also be confirmed by monitoring reflectivity change. For sample #2, the reflectivity of gold surface (front surface) decreases considerably from 74% to 66% after heat treatment of the disk at 95° C. for 17 hours.

Sample #3 has an oxide barrier between the Sb—Sn—In layer and the gold layer. Table II indicates that there is not any diffusion. Also, there is not any oxide formation on the surface.

TABLE II

Depth profile determined by RBS

| Sample # | | atoms/cm$^2$* | % Alloy** | % Au | % O | % Ar |
|---|---|---|---|---|---|---|
| 2 | layer 1 | 30 × 10$^{15}$*** | 50 | 20 | 30 | |
| | layer 2 | 175 × 10$^{15}$ | 70 | 28 | | 2 |
| | layer 3 | 105 × 10$^{15}$ | 93 | 5 | | 2 |
| | substrate | | | | | |

TABLE II-continued

Depth profile determined by RBS

| Sample # | | atoms/cm$^2$* | % Alloy** | % Au | % O | % Ar |
|---|---|---|---|---|---|---|
| 3 | layer 1 | 50 × 10$^{15}$ | | 100 | | |
| | layer 2 | 75 × 10$^{15}$ | 33 | | 67 | |
| | layer 3 | 250 × 10$^{15}$ | 98 | | | 2 |
| | substrate | | | | | |

*This depth profile is modeled using three layers
**Alloy = Sb—Sn—In
***This top layer is the layer farthest from the substrate The above example clearly shows that an oxide layer can effectively prevent the inter-diffusion between Sb—Sn—In atoms and Au atoms. As a result, the good performance of this alloy is preserved.

The magnitude of threshold may be adjusted by varying the gold film thickness. We found that the threshold increased to 5 mW when 20 nm gold layer was used.

The invention has been described in detail with particular reference to certain preferred embodiments thereof, but it will be understood that variations and modifications can be effected within the spirit and scope of the invention.

What is claimed is:

1. An optical recordable device comprising:
   a) a transparent substrate;
   b) a phase-change recordable layer consisting essentially of a phase-change material which is adapted to change phase and record data in response to laser heating and being disposed over the substrate;
   c) a barrier layer disposed on the phase-change layer the barrier layer being provided using an oxide of the phase-change material; and
   d) a heat conductive metal or alloy layer disposed on the barrier layer and selected to conduct heat during writing and reading of data; the barrier layer being selected to prevent interaction between the heat conductive layer and the phase-change recordable layer.

2. The optical recordable device of claim 1 including a protective layer disposed on the heat conductive layer to protect the device from physical damage during handling and use.

3. The optical recordable device of claim 1 wherein the thickness of the barrier layer is less than 20 nm.

4. The optical recordable device of claim 1 wherein the heat conductive layer is a layer having materials selected from the group consisting of Au, Ag, Sb, Al, Cu, and alloys thereof.

5. The optical recordable device of claim 4 wherein the thickness of the heat conductive layer is less than 25 nm.

6. The optical recordable device of claim 1 wherein the oxide is provided by oxidizing the surface of the phase-change layer.

7. The optical recordable device of claim 1 wherein the phase-change material is deposited in the presence of oxygen to form an oxide as the barrier layer.

8. The optical recordable device of claim 1 wherein the phase-change recordable layer is formed from an Sb-Sn-In alloy.

* * * * *